P. SCHLUETER.
WASHPAN.
APPLICATION FILED MAY 13, 1908.
924,384.
Patented June 8, 1909.
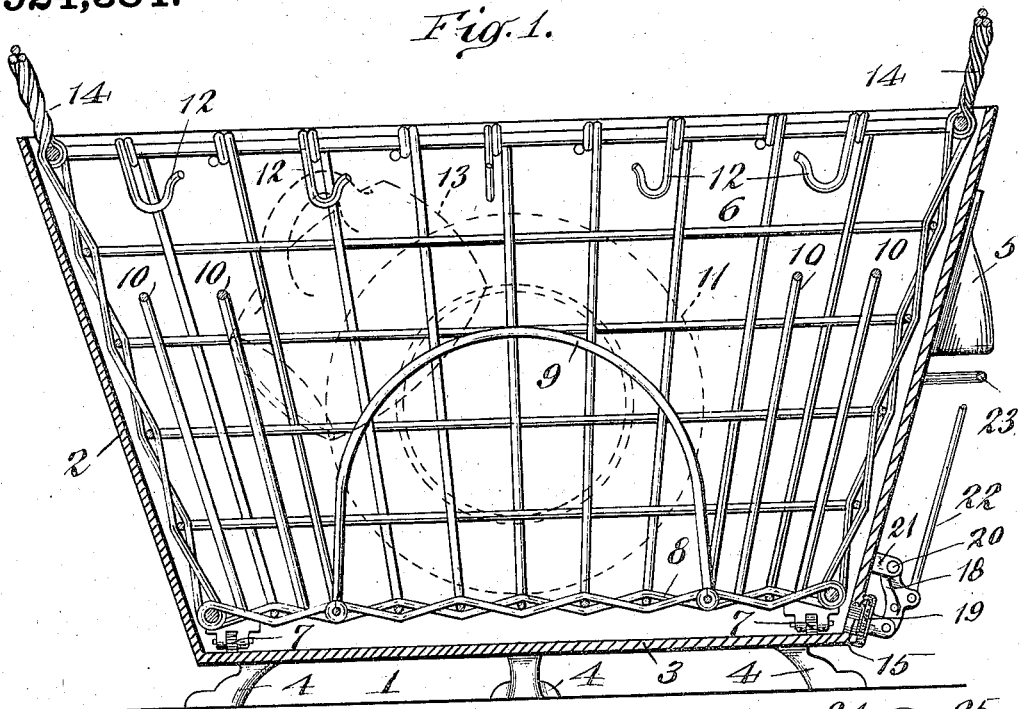
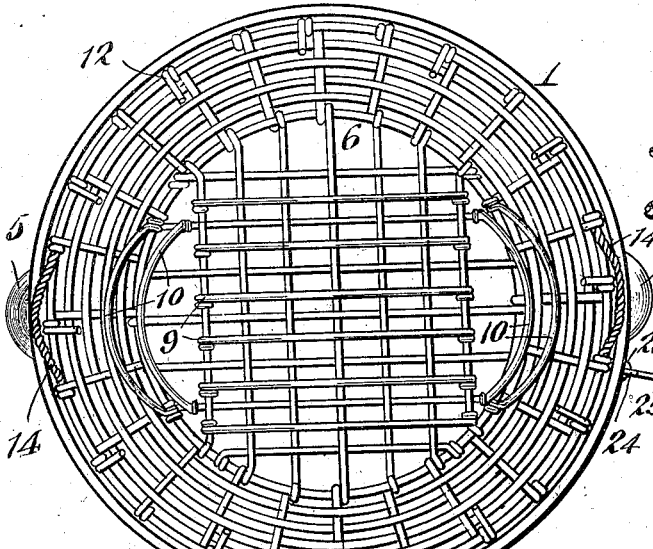
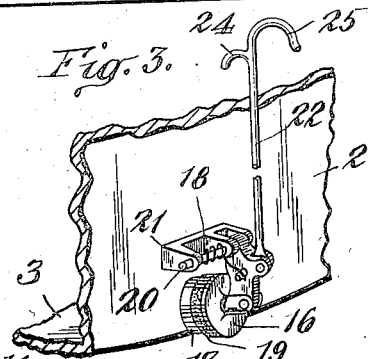
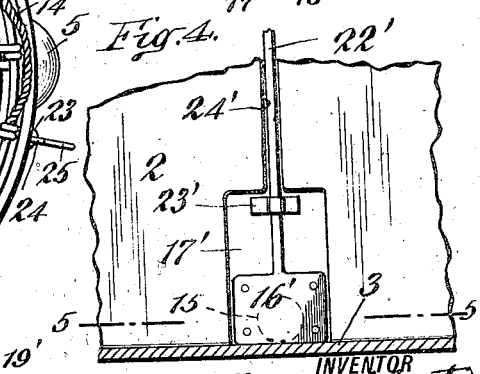
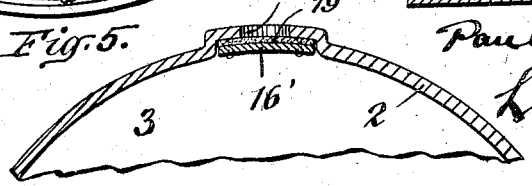
WITNESSES:
H. Crockeron
Geo. Tulschen
INVENTOR
Pauline Schlueter
BY
Leonard Day
Her ATTORNEY

UNITED STATES PATENT OFFICE.

PAULINE SCHLUETER, OF YONKERS, NEW YORK.

WASHPAN.

No. 924,384.  Specification of Letters Patent.  Patented June 8, 1909.

Application filed May 13, 1908. Serial No. 432,587.

*To all whom it may concern:*

Be it known that I, PAULINE SCHLUETER, a citizen of the United States, and a resident of Yonkers, county of Westchester, State of New York, have invented certain new and useful Improvements in Washpans, of which the following is a description.

This invention relates to labor saving means for washing and particularly to a wash pan and apparatus combined therewith of novel construction.

An object of the invention is to provide for the economical washing of various articles and in particular dishes with convenience and despatch, while minimizing breakage and manual contact with water.

Further objects of the invention will be apparent from the following description and claims.

The objects of my invention may be attained by the embodiments of my invention shown, for purposes of illustration, in the accompanying drawings, which form a part of this application, and in which like numerals designate corresponding parts in the several figures.

Figure 1, is a diametrical vertical section through the construction. Fig. 2 is a plan view of the construction with the dish basket rotated relatively to the pan from the position shown in Fig. 1. Fig. 3 is a detail perspective view with parts broken away of the manually controlled valve for the discharge opening. Fig. 4 is an interior elevation, with parts broken away, showing a modified valve construction. Fig. 5 is a horizontal section on line 5—5 of Fig. 4.

Referring now more in detail to the drawings: 1 indicates a pan of suitable size, shape and material, such as sheet metal, which may have flaring side walls 2 and a bottom 3, which may be flat, as shown. The pan may be of any desired cross section but preferably round as indicated. Supporting feet are indicated by the numeral 4 and suitable handles by 5.

A dish basket 6, illustrated as being of the same general shape as the pan 1 and of a size to nest therein, may be formed of suitably joined or woven wire so as to have an open mesh to permit the full circulation of water. The basket 6 is supported by the bottom 3 of the pan 1 and anti-friction means may be interposed between the bottom 3 and the basket to facilitate the ready rotation of the basket. This anti-friction means is illustrated in the form of rollers 7 secured to the bottom of the basket. The basket may be provided with portioning or staying means shown in the form of looped wires 9 and 10 suitably secured to the basket for spacing and holding on edge dishes such as 11, shown in dotted lines. These loops may be positioned as desired. Hooks 12 may be fitted to the rim of the basket for holding cups, as indicated by 13 in dotted lines. The basket is also shown as provided with upwardly projecting handles 14.

A discharge opening 15 is provided in the lower portion of the pan and preferably flush with the bottom 3, as shown. A valve 16 normally closes the opening 15 and in Figs. 1 and 3 is shown on the outside of the pan and pressed against its seat 17 by the spring 18. The valve may have suitable packing 19 such as leather, rubber or the like. This valve is hinged to the wall 2 by the pin and bracket 20, 21 and may be manually controlled by the upwardly extending finger engageable arm 22 held in position by passing under the bail 23. The arm 22 has a hook 24 to engage the rim of the wall 2 to hold the valve 16 open against the force of the spring 18 and a finger hold 25.

Figs. 4 and 5 show a modification of the valve construction in which the valve 16' and valve seat 17' are formed on the interior of the wall 2. The seat 17' is formed by striking or stamping out part of the wall 2, as shown. The valve 16' may be stamped out of sheet metal and the stem or arm 22' may be formed integrally therewith or be suitably secured thereto and be located in a stamped out channel 24', the parts being suitably secured to the wall 2 by means such as bail 23'. Suitable packing such as 19' may be interposed between the seat 17' and the valve 16' and is shown riveted to the valve 16'. A suitable finger hold similar to 25 may be formed on 22' and suitable provisions for holding this gate valve 16' open, which may be friction against the channel 24' or means similar to hook 24, are present. In this construction means, such as spring 18, need not be provided to seat the valve as the outwardly directed fluid pressure itself tends to seat the valve. However, if the gate valve 16' were on the exterior of the wall 2, some suitable seating means might be provided.

In using my apparatus, the dishes and other articles to be washed are placed in the basket, 2 the dishes preferably on edge between the partitions 9 and 10 while the cups may be suspended on the hooks 12 about the rim of the basket, the flare of which provides suitable space therefor. The basket 2, during this process is nested in the pan 1 or may then be placed therein, after which the pan 1 is filled with water and soap or water alone with the valve closing the discharge opening 15. When the pan is filled with water the basket with its contents may be lifted up and down or rotated by the handles 14 to clean and rinse the contents, the cleaning fluid having free access through the open meshed basket to its contents. After this the dish water may be allowed to escape with convenience by manipulating the arm 22 or 22′. The process may be repeated if desired. It is not necessary to immerse the hands while agitating the articles to be washed.

The pan without the basket is useful in washing various articles, as it may be filled repeatedly with washing fluid which may be discharged readily by the easily accessible valve mechanism without lifting the pan and contents to pour out the contents as heretofore. A pan of this type is many times placed in a sink, the walls of which prevent easy access to the discharge valve itself. Applicant's valve is, however, provided with upwardly extending means for manipulating the discharge valve into both open and closed position.

In connection with Figs. 4 and 5 it should be noted that the parts 16′, 22′ and 23′ do not protrude inwardly from the inside face of the wall 2 to prevent the ready movement of the basket.

I desire it to be understood that what I have shown and described is merely to illustrate embodiments of my invention and many changes and modifications are possible, also that parts of my invention may be used separately or in other combinations than those shown. I do not confine myself to the particular shape of dish pan or basket shown.

What I claim and desire to secure by Letters Patent is:—

1. In a self-discharging washer, an open mouthed pan having a substantially flat bottom and a discharge opening through the side of the pan and flush with the bottom of the pan; a valve; valve mechanism movably securing said valve to the outside of said pan; a valve seat formed about said discharge opening on the outside of the said pan; a spring normally holding said valve closed on said seat; a wire link extending upwardly along the side of said pan and secured at its lower end to said valve mechanism to manipulate said valve; and a hook at the upper end of said wire link to take over the rim of said pan and hold said valve open.

2. In a self-discharging washer, an open mouthed pan having a substantially flat bottom and a discharge opening through the side of the pan and flush with the bottom of the pan; a valve carried on one end of a bell-crank lever pivoted to the exterior of said pan; a valve seat formed about said discharge opening on the outside of said pan; a spring normally holding said valve closed on said seat; a wire link extending upwardly along the side of said pan and secured at its lower end to the free end of said bell-crank lever; a hook at the upper end of said wire link to take over the rim of said pan and hold said valve open; and a handle formed on the upper end of said wire link for manipulating the valve.

In testimony whereof, I have signed my name to this specification, in the presence of two subscribing witnesses.

PAULINE SCHLUETER.

Witnesses:
FRANCIS X. DONOGHUE,
P. A. JACKMAN.